T. G. PALMER.
NUT LOCK.
APPLICATION FILED MAR. 11, 1910. RENEWED DEC. 8, 1910.
998,797.
Patented July 25, 1911.
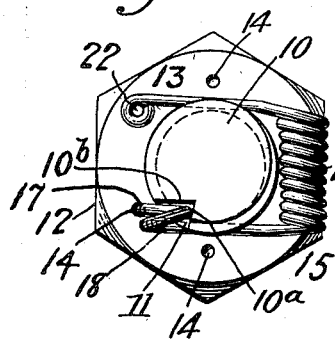
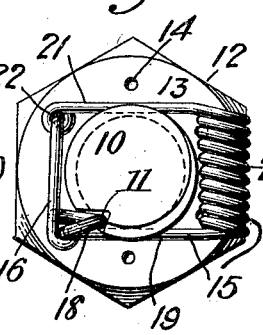
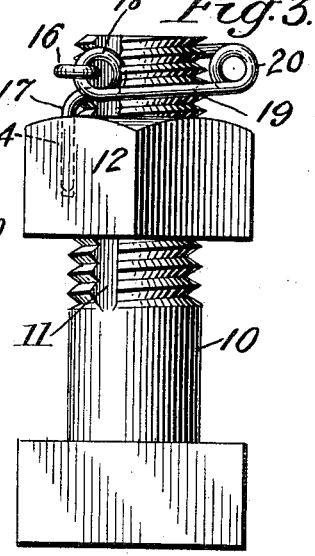
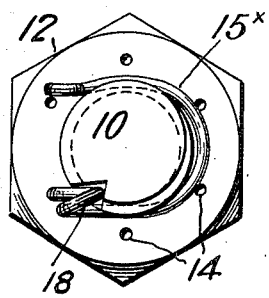
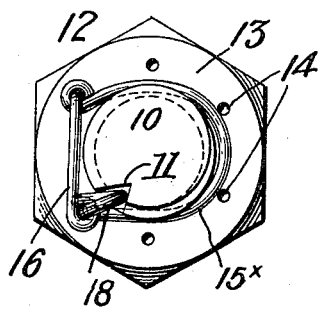
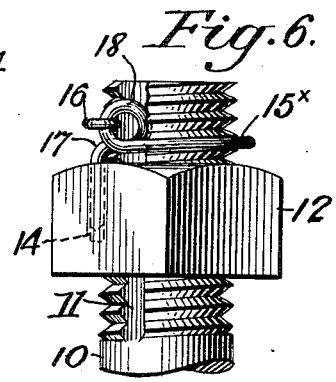
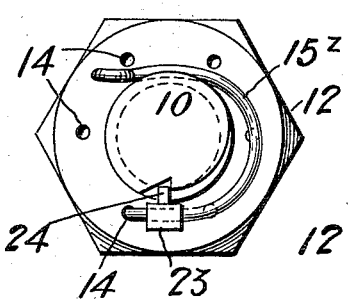
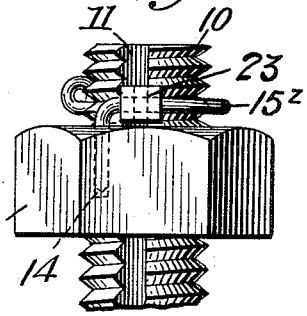
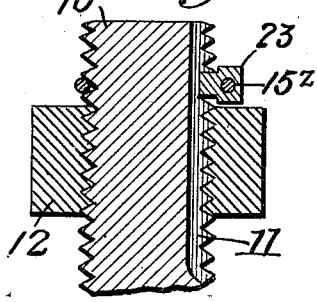
Witnesses.
Inventor.

UNITED STATES PATENT OFFICE.

TRUMAN G. PALMER, OF CHICAGO, ILLINOIS.

NUT-LOCK.

998,797. Specification of Letters Patent. Patented July 25, 1911.

Application filed March 11, 1910, Serial No. 548,641. Renewed December 8, 1910. Serial No. 596,374.

*To all whom it may concern:*

Be it known that I, TRUMAN G. PALMER, a citizen of the United States, and resident of Chicago, county of Cook, State of Illinois, have invented certain new and useful Improvements in Nut-Locks; and I do hereby declare the following to be a full, clear, and exact description of the invention, such as will enable others skilled in the art to which it appertains to make and use the same.

This invention relates to nut locks and the object of the invention is to provide a nut lock of such a construction that its operation will be very efficient and reliable, while the simplicity of the device will enable it to be manufactured very easily and at a small cost.

It is also aimed to furnish a nut lock in which the nut and bolt are modified to a minimum extent, the improved device comprising a locking attachment that can be readily and adjustably applied to the nut, and easily removed therefrom when desired.

The novel features of the invention will appear clearly from the following description and claims.

In the accompanying drawing:—Figure 1 is an end view of a nut lock embodying the invention, Fig. 2 is a similar view illustrating the use of an additional or auxiliary member in connection with the nut lock shown in Fig. 1, Fig. 3 is a side elevation of the nut lock shown in Fig. 2, Fig. 4 is an end view of a nut lock of modified form, Figs. 5 and 6 are an end view and a side elevation respectively of a further modified form of the device, and Figs. 7, 8 and 9 are an end view, a side elevation, and a longitudinal section, respectively, of a further modification of the device.

Referring to the drawing, and more particularly to Figs. 1 to 3, 10 is the bolt, which is of the ordinary construction except for a longitudinal groove 11 extending through the threaded portion. The groove is preferably V-shaped, as shown, one wall 10ª thereof being substantially radial with respect to the bolt, while the other wall 10ᵇ is in line with a chord of the circle defined by the bolt circumference, which chord does not intersect the bolt center. This arrangement of the groove, however, is not essential as regards the broader aspects of the invention. The nut 12, which is threaded on the bolt, is also of the usual form. At its outer face, denoted by reference character 13, it is provided with a plurality of holes 14 arranged in a circular series around the bolt and extending parallel to the latter at some distance therefrom, as shown. In the preferred form of the invention, these openings do not extend completely through the nut, but terminate at points within the latter, and form seats opening toward the outer nut face 13. These seats are adapted to receive a locking attachment which, in the forms under consideration, is made up of a bent wire member 15 in connection with which an additional member 16 may be used, as shown in Fig. 2. The locking attachment is adapted to be removably and adjustably positioned in the holes or seats of the nut, in such a manner as to engage the groove 11 of the bolt and at the same time to be firmly secured on the nut while in use. To this end, the member 15 is formed with a post 17 adapted to be freely set in any one of the holes 14, and at the outer end of the post the wire from which the member 15 is made is bent to form an eye 18 acting as a projection to take into the bolt groove. From the eye 18 the wire is extended to form a lateral branch 19, and at the end of this branch or portion it is formed with a right angularly directed helical coil 20 having an extension 21 directed parallel to the portion or branch 15 and provided with a small terminal eye 22. It will be understood that the locking member is in this way extended almost around the bolt, and the action of the coil 20 is such as to cause the extension or end portion 21 to bear against the bolt threads at a point approximately opposite to the groove 11, in which the eye or projection 18 is engaged. The wire of which the locking member is made is smaller than the distance between the apices of the bolt threads, so that when the parts are in the position shown in Fig. 1, the parts 19 and 21 will seat in the bolt threads at opposite sides of the bolt.

When the nut lock shown in Fig. 1 is to be assembled, the nut is screwed up on the bolt to nearly the exact position in which it is to be ultimately secured. The locking attachment is separate from the nut at this time. When the nut reaches the position indicated, the locking attachment is applied thereto, as indicated in Fig. 1, by setting the post 17 in a hole 14 adjacent the groove 11, after which the locking member is swung on the pivot formed by said post, into a position in which it embraces the bolt as shown. The nut is then moved into its ultimate position, where it is held by the snapping of the eye or projection 18 into the groove 11, due to the registering of said parts and the spring action of the locking member, the opposite portions or branches of which bind in the screw threads, as explained. When the parts are placed in this position, the relative angular turning of the nut and bolt will be absolutely prevented by the engagement of the locking member with the bolt groove. The outward swinging of the locking member away from the bolt is effectively prevented by the spring action of said member, as explained, and it is impossible for the locking member to move longitudinally of the bolt out of its seat 14, on account of the engagement of said member in the valley of the thread, as will be understood. It will be noted that when the ultimate locking position is reached, the locking projection 18 abuts directly against the substantially radial wall $10^a$ of the bolt groove, and owing to the reliable engagement which is maintained between these parts, an unlocking movement of the nut or bolt will be resisted with great effectiveness. On the other hand, the arrangement of the other wall $10^b$ is such that a movement of the nut or bolt in the locking direction when the locking member embraces the bolt, is not interfered with.

In Figs. 2 and 3, the link or connecting member 16 is shown as hooked at one end in the eye 22 of the portion or extension 21, and at the opposite end it is hooked to the eye 18. Said link is placed in this position after the locking member is placed in its locking position, and it is then impossible for the portions 19 and 21 of the locking member to spring away from each other, out of engagement with the bolt threads.

The helical coil 20 of the locking member may be omitted in some instances, as shown in Fig. 4. In the arrangement shown in said figure, the locking member $15^x$ is simply curved around the bolt, as shown. In this case, the wire of which the locking member is constructed, is so tempered that the member will be sufficiently resilient and engage the bolt at opposite points by its spring action. In order to place the locking member around the bolt, it is necessary to spread apart, to a slight extent, the legs or branches of the upper substantially U-shaped part of said member, so that a tight engagement will be effected between said member and the screw threads of the bolt. This arrangement may also be used in connection with the link 16, as shown in Figs. 5 and 6.

In the modification shown in Figs. 7 to 9, the locking member $15^z$ is similar to that shown in Figs. 4 to 6, with the exception that the integral eye 18, which engages the bolt groove 11, is replaced by a small locking dog 23, comprising a block through which the wire body of the locking member extends and which is provided with a small projection 24 to take into the bolt groove 11.

The different modifications described all operate in substantially the manner indicated in connection with the nut lock shown in Fig. 1. In each case, the spring locking member can be placed in position after the nut is screwed onto the bolt, and it can be set in any one of the circular series of holes or seats 14 in the outer nut face. When set in one of these holes, the locking member is capable of a free lateral swinging movement, which enables said locking member to be swung around the bolt and into gripping relation therewith, the groove-engaging projection being engaged with the bolt groove to retain the nut and bolt in the desired angular adjustment. The fact that the locking member is of very simple form and that it can be applied to the nut in different positions after the nut has been screwed onto the bolt is an important feature of the invention. A further important advantage arises from the locking engagement of the locking member in the valley of the bolt thread, so that when the member is in such a position that the relative angular movements of nut and bolt will be prevented, the movement of said member out of its seat, in a direction longitudinally of the bolt, will also be effectively prevented.

As previously intimated, the arrangement of the bolt groove 11, as described, may be varied in some instances, and it is also possible to place the U-shaped bolt embracing part of the locking member in a reversed relation with respect to the bolt.

I wish it to be understood that the different features of the devices shown may be interchanged without departing from the invention and that I have not attempted to show and describe all of the numerous modifications and arrangements that may be adopted without digressing from my inventive idea.

What I claim is:—

1. The combination with a longitudinally grooved bolt, and a nut thereon, of a locking member freely set in an opening in the outer nut face and formed to embrace and directly engage the bolt, said member having a projection to take into the bolt groove.

2. The combination with a longitudinally grooved bolt, and a nut thereon having a circular series of holes or sockets in its outer face, of a locking member comprising a post intended to seat in any of said holes or sockets, a projection carried by said member to engage the bolt groove, and means to hold said post in its hole or socket in the nut when said locking member is in its operative position.

3. The combination with a longitudinally grooved bolt, and a nut, of a locking device comprising a post freely set in a seat or socket in the outer nut face, and a projection on said device to take into the bolt groove, said device having a laterally swinging movement in its seat and interlocking with the bolt threads when in operative position.

4. The combination with a grooved bolt, and a nut threaded thereon, of a spring locking member mounted on the nut to swing laterally thereon and to embrace the bolt, and a projection on said member to take into the bolt groove.

5. The combination with a grooved bolt, and a nut threaded thereon, of a spring locking member mounted on the outer nut face to swing laterally into locking engagement with the bolt threads, and a projection on said member to take into the bolt groove.

6. The combination with a grooved bolt, and a nut threaded thereon, of a spring locking member formed to embrace the bolt and lie in the thread thereof, said member being detachably swiveled on the outer nut face, and having means to engage the bolt groove.

7. The combination with a grooved bolt, and a nut threaded thereon and having a hole or seat in its outer face at a point remote from the bolt, of a locking member comprising a post intended to be set in said hole or seat, means to embrace the bolt and engage in the threads thereof at substantially opposite points, and means to engage the bolt groove.

8. The combination with a grooved bolt, and a nut threaded thereon, and having a hole or seat in its outer face, of a locking member comprising a post intended to be set in said hole or seat, an eye formed in said member at the upper end of the post and adapted to engage the bolt groove, and a substantially U-shaped spring portion extending from said eye and arranged to embrace and grip the bolt.

9. The combination with a grooved bolt, and a nut threaded thereon, of a swinging locking member swiveled on the outer face of the bolt and comprising a projection to engage the bolt groove, and a substantially U-shaped bolt embracing part, and a link connecting the free extremity of said member with a fixed point on the latter.

In testimony whereof I affix my signature, in presence of two witnesses.

TRUMAN G. PALMER.

Witnesses:
M. A. SEDGWICK,
AARON GOVE.